(12) United States Patent
Crow et al.

(10) Patent No.: US 8,698,811 B1
(45) Date of Patent: *Apr. 15, 2014

(54) NESTED BOUSTROPHEDONIC PATTERNS FOR RASTERIZATION

(75) Inventors: Franklin C. Crow, Portola Valley, CA (US); Justin S. Legakis, Sunnyvale, CA (US); Jeffrey R. Sewall, Pleasanton, CA (US)

(73) Assignee: Nvidia Corporation, Santa Clara, CA (US)

( * ) Notice: Subject to any disclaimer, the term of this patent is extended or adjusted under 35 U.S.C. 154(b) by 518 days.

This patent is subject to a terminal disclaimer.

(21) Appl. No.: 11/304,888

(22) Filed: Dec. 15, 2005

(51) Int. Cl.
| | |
|---|---|
| G06T 1/00 | (2006.01) |
| G06T 1/20 | (2006.01) |
| G06T 15/40 | (2011.01) |
| G06T 15/50 | (2011.01) |
| G06F 15/00 | (2006.01) |

(52) U.S. Cl.
USPC ........... 345/501; 345/506; 345/419; 345/423; 345/425

(58) Field of Classification Search
USPC .......... 345/501, 506, 523, 419, 421, 423, 426
See application file for complete search history.

(56) References Cited

U.S. PATENT DOCUMENTS

| | | | |
|---|---|---|---|
| 4,208,810 A | 6/1980 | Rohner et al. | |
| 4,918,626 A | 4/1990 | Watkins et al. | |
| 5,081,594 A | 1/1992 | Horsley | |
| 5,287,438 A | 2/1994 | Kelleher | |
| 5,313,287 A | 5/1994 | Barton | |
| 5,432,898 A | 7/1995 | Curb et al. | |
| 5,446,836 A | 8/1995 | Lentz et al. | |
| 5,452,104 A * | 9/1995 | Lee | 358/426.14 |
| 5,452,412 A | 9/1995 | Johnson, Jr. et al. | |
| 5,483,258 A | 1/1996 | Cornett et al. | |
| 5,543,935 A | 8/1996 | Harrington | |
| 5,570,463 A | 10/1996 | Dao | |
| 5,594,854 A | 1/1997 | Baldwin et al. | |
| 5,623,692 A | 4/1997 | Priem et al. | |
| 5,633,297 A | 5/1997 | Valko et al. | |
| 5,664,162 A | 9/1997 | Dye | |
| 5,815,162 A | 9/1998 | Levine | |

(Continued)

FOREIGN PATENT DOCUMENTS

| | | |
|---|---|---|
| CN | 101093578 | 12/2007 |
| JP | 06180758 | 6/1994 |

(Continued)

OTHER PUBLICATIONS

A VLSI architecture for updating raster-scan displays Satish Gupta, Robert F. Sproull, Ivan E. Sutherland Aug. 1981 ACM SIGGRAPH Computer Graphics, Proceedings of the 8th annual conference on Computer graphics and interactive techniques SIGGRAPH '81, vol. 15 Issue 3 Publisher: ACM Press.

(Continued)

Primary Examiner — Tize Ma

(57) ABSTRACT

A method for traversing pixels of an area is described. The method includes the steps of traversing a plurality of pixels of an image using a first boustrophedonic pattern along a predominant axis, and, during the traversal using the first boustrophedonic pattern, traversing a plurality of pixels of the image using a second boustrophedonic pattern. The second boustrophedonic pattern is nested within the first boustrophedonic pattern.

20 Claims, 5 Drawing Sheets

(56) References Cited

U.S. PATENT DOCUMENTS

| | | |
|---|---|---|
| 5,854,631 A | 12/1998 | Akeley et al. |
| 5,854,637 A | 12/1998 | Sturges |
| 5,872,902 A | 2/1999 | Kuchkuda et al. |
| 5,977,987 A | 11/1999 | Duluk, Jr. |
| 6,028,608 A | 2/2000 | Jenkins |
| 6,034,699 A | 3/2000 | Wong et al. |
| 6,072,500 A | 6/2000 | Foran et al. |
| 6,104,407 A | 8/2000 | Aleksic et al. |
| 6,104,417 A | 8/2000 | Nielsen et al. |
| 6,115,049 A | 9/2000 | Winner et al. |
| 6,118,394 A | 9/2000 | Onaya |
| 6,128,000 A | 10/2000 | Jouppi et al. |
| 6,137,918 A | 10/2000 | Harrington et al. |
| 6,160,557 A | 12/2000 | Narayanaswami |
| 6,160,559 A | 12/2000 | Omtzigt |
| 6,188,394 B1 | 2/2001 | Morein et al. |
| 6,201,545 B1 | 3/2001 | Wong et al. |
| 6,204,859 B1 | 3/2001 | Jouppi et al. |
| 6,219,070 B1 | 4/2001 | Baker et al. |
| 6,249,853 B1 | 6/2001 | Porterfield |
| 6,259,460 B1 | 7/2001 | Gossett et al. |
| 6,323,874 B1 | 11/2001 | Gossett |
| 6,359,623 B1 | 3/2002 | Larson |
| 6,362,819 B1 | 3/2002 | Dalal et al. |
| 6,366,289 B1 | 4/2002 | Johns |
| 6,429,877 B1 | 8/2002 | Stroyan |
| 6,437,780 B1 | 8/2002 | Baltaretu et al. |
| 6,452,595 B1 | 9/2002 | Montrym et al. |
| 6,469,707 B1 | 10/2002 | Voorhies |
| 6,480,205 B1 | 11/2002 | Greene et al. |
| 6,501,564 B1 | 12/2002 | Schramm et al. |
| 6,504,542 B1 | 1/2003 | Voorhies et al. |
| 6,522,329 B1 | 2/2003 | Ihara et al. |
| 6,525,737 B1 | 2/2003 | Duluk, Jr. et al. |
| 6,529,207 B1 | 3/2003 | Landau et al. |
| 6,606,093 B1 | 8/2003 | Gossett et al. |
| 6,611,272 B1 | 8/2003 | Hussain et al. |
| 6,614,444 B1 | 9/2003 | Duluk, Jr. et al. |
| 6,614,448 B1 | 9/2003 | Garlick et al. |
| 6,624,823 B2 | 9/2003 | Deering |
| 6,633,197 B1 | 10/2003 | Sutardja |
| 6,633,297 B2 | 10/2003 | McCormack et al. |
| 6,646,639 B1 | 11/2003 | Greene et al. |
| 6,671,000 B1 | 12/2003 | Cloutier |
| 6,693,637 B2 | 2/2004 | Koneru et al. |
| 6,693,639 B2 | 2/2004 | Duluk, Jr. et al. |
| 6,697,063 B1 | 2/2004 | Zhu |
| 6,717,576 B1 | 4/2004 | Duluk, Jr. et al. |
| 6,717,578 B1 | 4/2004 | Deering |
| 6,734,861 B1 | 5/2004 | Van Dyke et al. |
| 6,741,247 B1 | 5/2004 | Fenney |
| 6,747,057 B2 | 6/2004 | Ruzafa et al. |
| 6,765,575 B1 | 7/2004 | Voorhies et al. |
| 6,778,177 B1 | 8/2004 | Furtner |
| 6,788,301 B2 | 9/2004 | Thrasher |
| 6,798,410 B1 | 9/2004 | Redshaw et al. |
| 6,803,916 B2 | 10/2004 | Ramani et al. |
| 6,819,332 B2 | 11/2004 | Baldwin |
| 6,833,835 B1 | 12/2004 | van Vugt |
| 6,906,716 B2 | 6/2005 | Moreton et al. |
| 6,938,176 B1 | 8/2005 | Alben et al. |
| 6,940,514 B1 | 9/2005 | Wasserman et al. |
| 6,947,057 B2 | 9/2005 | Nelson et al. |
| 6,956,579 B1 | 10/2005 | Diard et al. |
| 6,961,057 B1 | 11/2005 | Van Dyke et al. |
| 6,978,317 B2 | 12/2005 | Anantha et al. |
| 7,002,591 B1 | 2/2006 | Leather et al. |
| 7,009,607 B2 | 3/2006 | Lindholm et al. |
| 7,009,615 B1 | 3/2006 | Kilgard et al. |
| 7,061,495 B1 | 6/2006 | Leather |
| 7,064,771 B1 | 6/2006 | Jouppi et al. |
| 7,075,542 B1 | 7/2006 | Leather |
| 7,081,902 B1 | 7/2006 | Crow et al. |
| 7,119,809 B1 | 10/2006 | McCabe |
| 7,126,600 B1 | 10/2006 | Fowler et al. |
| 7,154,066 B2 | 12/2006 | Talwar et al. |
| 7,158,148 B2 | 1/2007 | Toji et al. |
| 7,170,515 B1 | 1/2007 | Zhu |
| 7,184,040 B1 | 2/2007 | Tzvetkov |
| 7,224,364 B1 | 5/2007 | Yue et al. |
| 7,307,628 B1 | 12/2007 | Goodman et al. |
| 7,307,638 B2 | 12/2007 | Leather et al. |
| 7,382,368 B1 | 6/2008 | Molnar et al. |
| 7,453,466 B2 | 11/2008 | Hux et al. |
| 7,483,029 B2 | 1/2009 | Crow et al. |
| 7,548,996 B2 | 6/2009 | Baker et al. |
| 7,551,174 B2 | 6/2009 | Iourcha et al. |
| 7,633,506 B1 | 12/2009 | Leather et al. |
| 7,634,637 B1 | 12/2009 | Lindholm et al. |
| 7,791,617 B2 | 9/2010 | Crow et al. |
| 7,965,902 B1 | 6/2011 | Zelinka et al. |
| 8,063,903 B2 | 11/2011 | Vignon et al. |
| 2001/0005209 A1* | 6/2001 | Lindholm et al. ............ 345/506 |
| 2002/0050979 A1 | 5/2002 | Oberoi et al. |
| 2002/0097241 A1 | 7/2002 | McCormack et al. |
| 2002/0130863 A1 | 9/2002 | Baldwin |
| 2002/0140655 A1 | 10/2002 | Liang et al. |
| 2002/0158885 A1 | 10/2002 | Brokenshire et al. |
| 2002/0196251 A1 | 12/2002 | Duluk, Jr. et al. |
| 2003/0058244 A1 | 3/2003 | Ramani et al. |
| 2003/0067468 A1 | 4/2003 | Duluk, Jr. et al. |
| 2003/0076325 A1 | 4/2003 | Thrasher |
| 2003/0122815 A1 | 7/2003 | Deering |
| 2003/0163589 A1 | 8/2003 | Bunce et al. |
| 2003/0194116 A1* | 10/2003 | Wong et al. .................... 382/128 |
| 2003/0201994 A1 | 10/2003 | Taylor et al. |
| 2004/0046764 A1 | 3/2004 | Lefebvre et al. |
| 2004/0085313 A1 | 5/2004 | Moreton et al. |
| 2004/0130552 A1 | 7/2004 | Duluk, Jr. et al. |
| 2004/0183801 A1 | 9/2004 | Deering |
| 2004/0196285 A1 | 10/2004 | Rice et al. |
| 2004/0207642 A1 | 10/2004 | Crisu et al. |
| 2004/0246251 A1 | 12/2004 | Fenney et al. |
| 2005/0030314 A1 | 2/2005 | Dawson |
| 2005/0041037 A1 | 2/2005 | Dawson |
| 2005/0066148 A1 | 3/2005 | Luick |
| 2005/0122338 A1 | 6/2005 | Hong et al. |
| 2005/0134588 A1 | 6/2005 | Aila et al. |
| 2005/0134603 A1 | 6/2005 | Iourcha et al. |
| 2005/0179698 A1 | 8/2005 | Vijayakumar et al. |
| 2005/0259100 A1 | 11/2005 | Teruyama |
| 2006/0044317 A1 | 3/2006 | Bourd et al. |
| 2006/0170690 A1 | 8/2006 | Leather |
| 2006/0203005 A1 | 9/2006 | Hunter |
| 2006/0245001 A1 | 11/2006 | Lee et al. |
| 2006/0267981 A1 | 11/2006 | Naoi |
| 2007/0139440 A1 | 6/2007 | Crow et al. |
| 2007/0268298 A1 | 11/2007 | Alben et al. |
| 2007/0273689 A1 | 11/2007 | Tsao |
| 2007/0296725 A1 | 12/2007 | Steiner et al. |
| 2008/0024497 A1 | 1/2008 | Crow et al. |
| 2008/0024522 A1 | 1/2008 | Crow et al. |
| 2008/0100618 A1 | 5/2008 | Woo et al. |
| 2008/0273218 A1 | 11/2008 | Kitora et al. |

FOREIGN PATENT DOCUMENTS

| | | |
|---|---|---|
| JP | 10134198 | 5/1998 |
| JP | 11195132 | 7/1999 |
| JP | 2005182547 | 7/2005 |
| WO | 0013145 | 3/2000 |

OTHER PUBLICATIONS

A parallel algorithm for polygon rasterization Juan Pineda Jun. 1988 ACM.

A hardware assisted design rule check architecture Larry Seiler Jan. 1982 Proceedings of the 19th conference on design automation DAC '82 Publisher: IEEE Press.

Non-Final OA Dated Nov. 27, 2007; U.S. Appl. No. 11/304,904.

Non-Final OA Dated May 1, 2007; U.S. Appl. No. 11/304,904.

(56) References Cited

OTHER PUBLICATIONS

Crow; "The Use of Grayscale for Improves Raster Display of Vectors and Characters;" University of Texas, Austin, Texas; Work supported by the National Science Foundation unser Grants MCS 76-83889; pp. 1-5: ACM Press.

Boyer, et al.; "Discrete Analysis for Antialiased Lines;" Eurographics 2000; 3 Pages.

Blythe, OpenGL Section 3.4.1, "Basic Line Segment Rasterization", Mar. 29, 1997, pp. 1-3.

Foley, J. "Computer Graphics: Principles and Practice", 1987, Addison-Wesley Publishing, 2nd Edition, p. 545-546.

Fuchs; "Fast Spheres Shadow, Textures, Transparencies, and Image Enhancements in Pixel-Planes"; ACM; 1985; Department of Computer Science, University of North Carolina at Chapel Hill, Chapel Hill, NC 27514.

* cited by examiner

NESTED BOUSTROPHEDONIC PATTERNS FOR RASTERIZATION

CROSS REFERENCE TO RELATED APPLICATIONS

This application is related to, and incorporates by reference, the following commonly assigned U.S. Patent Application, A GPU HAVING RASTER COMPONENTS CONFIGURED FOR USING NESTED BOUSTROPHEDONIC PATTERNS TO TRAVERSE SCREEN AREAS, by Crow, et al., filed on Dec. 15, 2005, Ser. No. 11/304,904.

FIELD OF THE INVENTION

The present invention is generally related to hardware accelerated graphics computer systems.

BACKGROUND OF THE INVENTION

Recent advances in computer performance have enabled graphic systems to provide more realistic graphical images using personal computers, home video game computers, handheld devices, and the like. In such graphic systems, a number of procedures are executed to "render" or draw graphic primitives to the screen of the system. A "graphic primitive" is a basic component of a graphic picture, such as a vertex, polygon, or the like. Rendered images are formed with combinations of these graphic primitives. Many procedures may be utilized to perform 3-D graphics rendering.

Specialized graphics processing units (e.g., GPUs, etc.) have been developed to optimize the computations required in executing the graphics rendering procedures. The GPUs are configured for high-speed operation and typically incorporate one or more rendering pipelines. Each pipeline includes a number of hardware-based functional units that are optimized for high-speed execution of graphics instructions/data, where the instructions/data are fed into the front end of the pipeline and the computed results emerge at the back end of the pipeline. The hardware-based functional units, cache memories, firmware, and the like, of the GPU are optimized to operate on the low-level graphics primitives (e.g., comprising "points", "lines", "triangles", etc.) and produce real-time rendered 3-D images.

The real-time rendered 3-D images are generated using raster display technology. Raster display technology is widely used in computer graphics systems, and generally refers to the mechanism by which the grid of multiple pixels comprising an image are influenced by the graphics primitives. For each primitive, a typical rasterization system generally steps from pixel to pixel and determines whether or not to "render," or write a given pixel into a frame buffer or pixel map, as per the contribution of the primitive. This, in turn, determines how to write the data to the display buffer representing each pixel.

Various traversal algorithms have been developed for moving from pixel to pixel in a way such that all pixels within the primitive are covered. For example, some solutions involve generating the pixels in a unidirectional manner. Such traditional unidirectional solutions involve generating the pixels row-by-row in a constant direction. This requires that the sequence shift across the primitive to a starting location on a first side of the primitive upon finishing at a location on an opposite side of the primitive. Each time this shift is executed, pixels or texture values are stored which were not positioned adjacent to pixels or texture values processed immediately beforehand. Therefore, such distant pixels or texture values have a greater chance of belonging to different memory access blocks, making such access inefficient.

Thus, a need exists for a rasterization process that can ensure needed graphics rendering data (e.g., texture values, normal maps, etc.) can be maintained in memory for an efficient access by the GPU.

SUMMARY OF THE INVENTION

Embodiments of the present invention provide a method and system for ensuring needed graphics rendering data (e.g., texture values, normal maps, etc.) can be maintained in low latency memory for an efficient access by the GPU. Embodiments of the present invention provide fast and efficient real-time 3-D graphics rendering by increasing the efficiency of cache memory access and by limiting the performance penalties resulting from accessing higher latency memory.

In one embodiment, the present invention is implemented as a method for traversing pixels of an area, including the steps of traversing a plurality of pixels of an image using a first boustrophedonic pattern along a predominant axis, and, during the traversal using the first boustrophedonic pattern, traversing a plurality of pixels of the image using a second boustrophedonic pattern. The second boustrophedonic pattern is nested within the first boustrophedonic pattern. The predominant axis of the first boustrophedonic pattern can be a horizontal axis, the second boustrophedonic pattern can be along a vertical axis. Similarly, the predominant axis of the first boustrophedonic pattern can be a vertical axis, the second boustrophedonic pattern can be along a horizontal axis.

In one embodiment, the plurality of pixels of the image are grouped as tiles and the tiles are traversed using the first boustrophedonic pattern and the second boustrophedonic pattern (e.g., nested within the first pattern). Additionally, in one embodiment, the first boustrophedonic pattern and the second boustrophedonic pattern are configured to maintain locality with respect to cache memory accesses.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
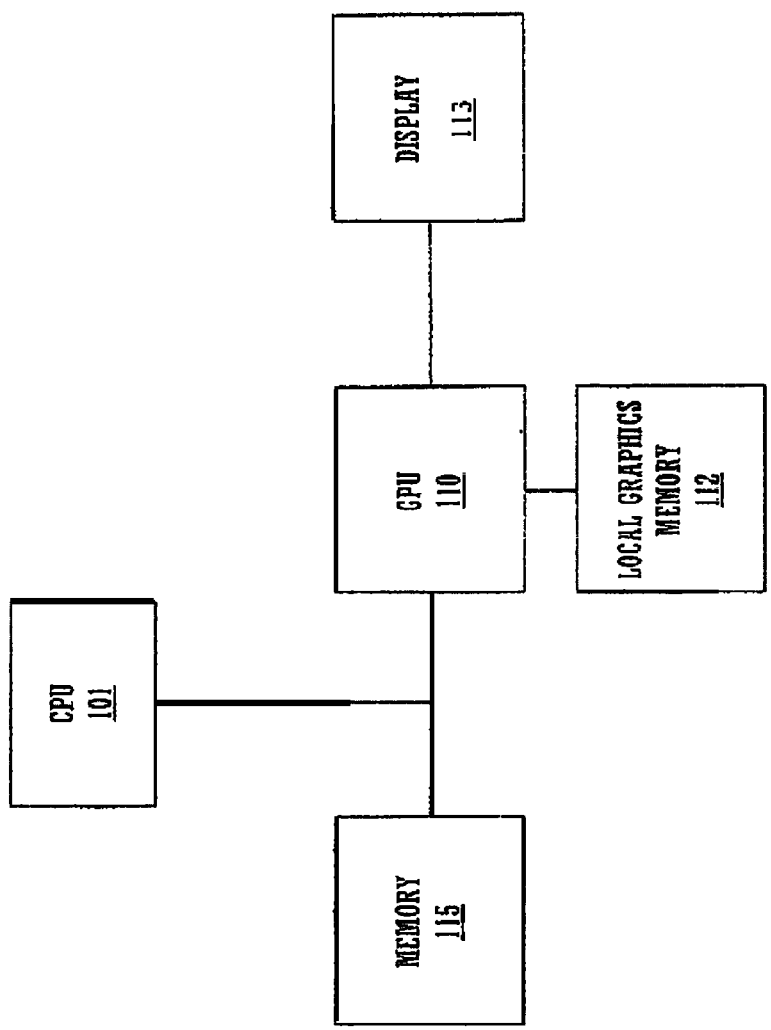
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 113. One or more additional GPUs can optionally be coupled to system 100 to further increase its computational power. The GPU(s) 110 is coupled to the CPU 101 and the system memory 115. System 100 can be implemented as, for example, a desktop computer system or server computer system, having a powerful general-purpose CPU 101 coupled to a dedicated graphics rendering GPU 110. In such an embodiment, components can be included that add peripheral buses, specialized graphics memory, IO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 112 can be included for the GPU 110 for high bandwidth graphics data storage.

EMBODIMENTS OF THE INVENTION

Figure 2:
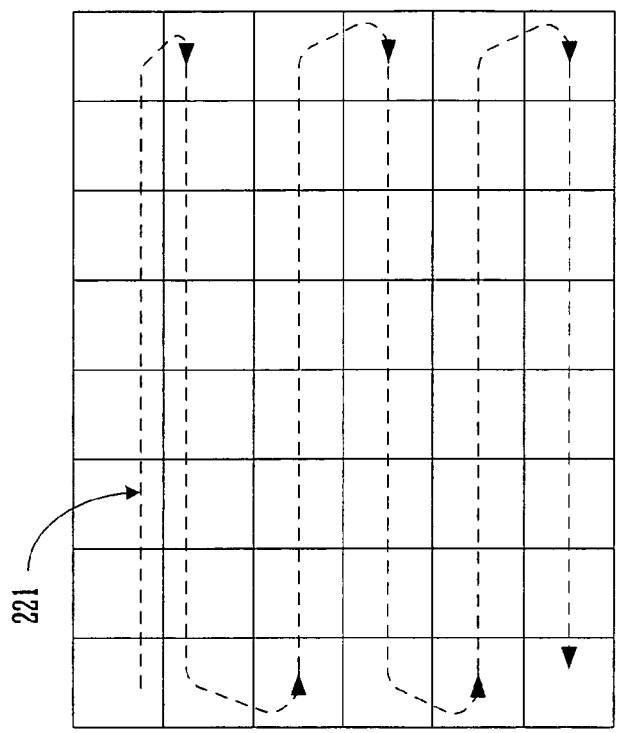
FIG. 2 shows a diagram depicting a grid of pixels being rasterized in a boustrophedonic pattern in accordance with one embodiment of the present invention.

FIG. 2 shows a diagram 200 depicting a grid of pixels being rasterized in a boustrophedonic pattern in accordance with one embodiment of the present invention. As depicted in FIG. 2, the boustrophedonic pattern is indicated by the dotted line 221.

In one embodiment, as depicted in diagram 200 of FIG. 2, each pixel of the grid of pixels is traversed in the order indicated by the line 221. The line 221 shows a boustrophedonic pattern of traversal, where the term "boustrophedonic" refers to a traversal pattern which visits all pixels on a 2D area by scanning back and forth along one axis as each pass moves farther along on the orthogonal axis, much as a farmer would plow or mow a field. The term Boustrophedonic generally means "as the oxen plows" as in, for example, a field.

Thus, as depicted in FIG. 2, this boustrophedonic rasterization refers to a serpentine pattern that folds back and forth along a predominant axis. In the FIG. 2 example, the predominant axis is horizontal. A horizontal boustrophedonic sequence, for example, may generate all the pixels within a primitive triangle that are on one row from left to right, and then generate the next row right to left, and so on. Such a folded path ensures that an average distance from a generated pixel to recently previously generated pixels is relatively small.

Referring still to FIG. 2, a boustrophedonic pattern for visiting the areas of the screen covered when rasterizing a large primitive (e.g., triangles, etc.) has advantages for maintaining a cache of relevant data and reducing the memory requests required for frame buffer and texture access. For example, generating pixels that are near recently generated pixels is important when recent groups of pixels and/or their corresponding texture values are kept in memories of a limited size.

One such memory is cache memory. Cache memory is optimized for high speed, low latency access. However the amount of cache memory available to the GPU is typically much less than the total frame buffer memory needed. Thus, the boustrophedonic sequence more often finds the pixels or texture values already loaded into cache memory, and therefore avoiding costly high latency accesses to slower frame buffer memory (e.g., local graphics memory 112) or even the much lower system memory (e.g., memory 115).

It should be noted that in one embodiment, instead of implementing a boustrophedonic pattern traversal of a grid of pixels, the boustrophedonic pattern traversal can be implemented on a grid of tiles. In such an embodiment, each tile comprises a block of pixels. The size of the tile (e.g., number of pixels per tile) is generally tailored in accordance with the rendering power of the GPU and/or the size of the cache memory or frame buffer memory. In one embodiment, the size of the tile is programmable and can be dynamically selected to be, for example, 4×4, 8×8, 16×16, 32×32, 64×64, 128×128, or the like, including any rectangular (as well as square) array of pixels or subpixels per tile).

Figure 3:
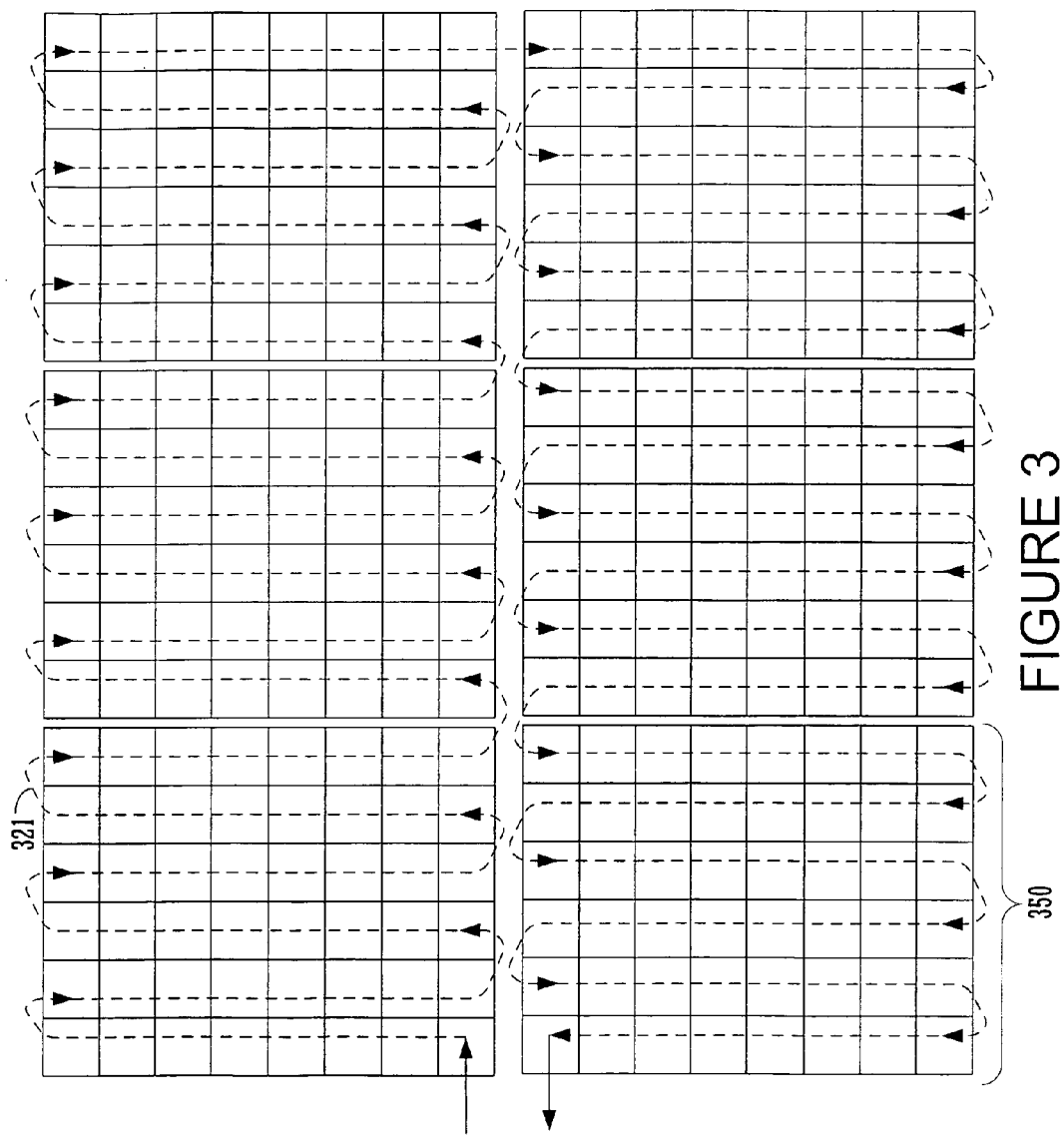
FIG. 3 shows a diagram depicting a first boustrophedonic pattern and a second boustrophedonic pattern nested inside the first boustrophedonic pattern over a grid of tiles in accordance with one embodiment of the present invention.

FIG. 3 shows a diagram 300 depicting a first boustrophedonic pattern and a second boustrophedonic pattern nested inside the first boustrophedonic pattern over a grid of tiles in accordance with one embodiment of the present invention.

As described above, a horizontal boustrophedonic pattern (e.g., a horizontal predominant axis), refers to a serpentine pattern that folds back and forth along the horizontal axis. In the present embodiment, a second boustrophedonic pattern is embedded within this first horizontal boustrophedonic pattern. As depicted in FIG. 3, the second boustrophedonic pattern is a vertical boustrophedonic pattern. This is indicated by line 321 which folds back and forth along the vertical axis. The vertical boustrophedonic pattern folds back and forth along the vertical axis as it progresses along the horizontal axis of the overarching horizontal boustrophedonic pattern. Once the vertical boustrophedonic pattern has progressed to the right hand side of the upper row of tiles (e.g., where the row is 8 tiles high), it folds back across itself horizontally, and progresses back towards the left hand side of the lower row of tiles. As it progresses from the right hand side to the left-hand side of the lower row of tiles, the vertical boustrophedonic pattern can be seen folding up and down, all the way along the lower row.

In this manner, embodiments of the present invention can embed a second vertical boustrophedonic pattern into a first horizontal boustrophedonic pattern. The embedding of the second boustrophedonic pattern into the first boustrophedonic pattern serves to further localize data accesses and limit cache misses. For example, the multiple embedded boustrophedonic patterns can be configured to align closely with the size and configuration of the cache memory of the GPU (e.g., cache line sizes, etc.). This feature helps to maintain locality with respect to cache memory accesses. The multiple embedded boustrophedonic patterns can also be configured to maintain locality with respect to memory bank accesses of the frame buffer memory 112, where multiple DRAM banks (not shown) comprise the frame buffer memory 112. Furthermore, the multiple boustrophedonic patterns can be configured to align with a prefetching process for accessing memory, where the prefetching process relies upon a predictable memory access pattern so that it can look ahead to fetch data from memory into the GPU's cache.

Figure 4:
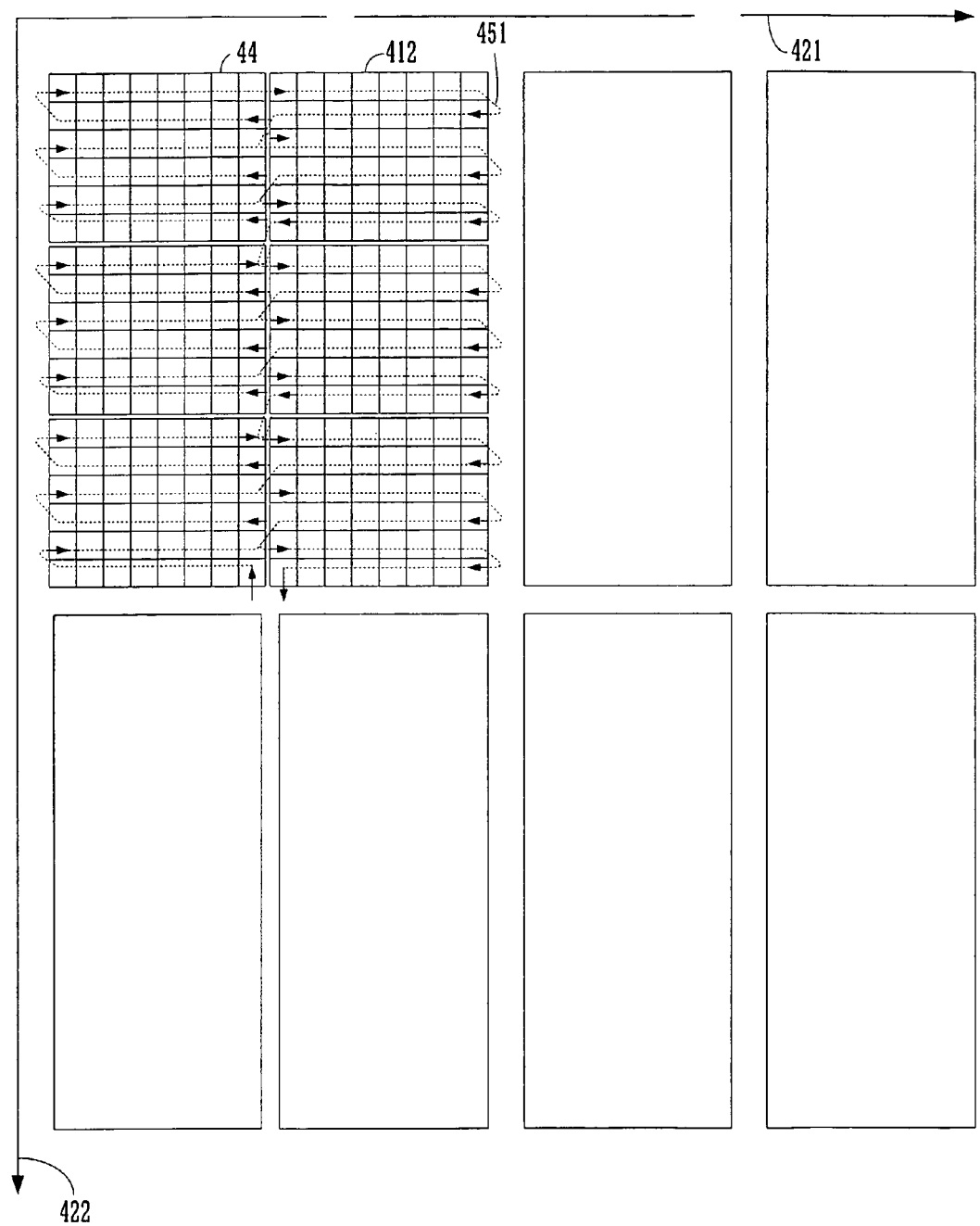
FIG. 4 shows a more complex, multiple nested boustrophedonic pattern traversal process in accordance with one embodiment of the present invention.

FIG. 4 shows a more complex, multiple nested boustrophedonic pattern traversal process in accordance with one embodiment of the present invention. As depicted in FIG. 4, a sub-tile 411 and a sub-tile 412 are shown. The sub-tiles 411-412 are sub-tiles of a larger tile, such as, for example, title 350 shown in FIG. 3. Line 451 shows the manner in which a third horizontal boustrophedonic pattern and a fourth vertical boustrophedonic pattern can be further nested inside the first horizontal boustrophedonic pattern and second vertical boustrophedonic pattern described in FIG. 3 above, with respect to the horizontal axis 421 and the vertical axis 422. In this manner, embodiments of the present invention can embed a plurality of boustrophedonic patterns into the first boustrophedonic pattern, which serves to localize data accesses and limit cache misses to a much finer degree.

It should be noted that, as described above, embodiments of the present invention can operate on individual pixels, or even arrays of samples within pixels, in addition to tiles of pixels, and the size of the tiles can be customized in accordance with the needs of a particular application (e.g., programmable by a graphics driver, etc.). Additionally, it should be noted that the configuration of the boustrophedonic patterns can be customized in accordance with the needs of a particular application (e.g., programmable by a graphics driver, etc.). For example, the first and second boustrophedonic patterns can be vertical and horizontal, horizontal and vertical, or the like.

Figure 5:
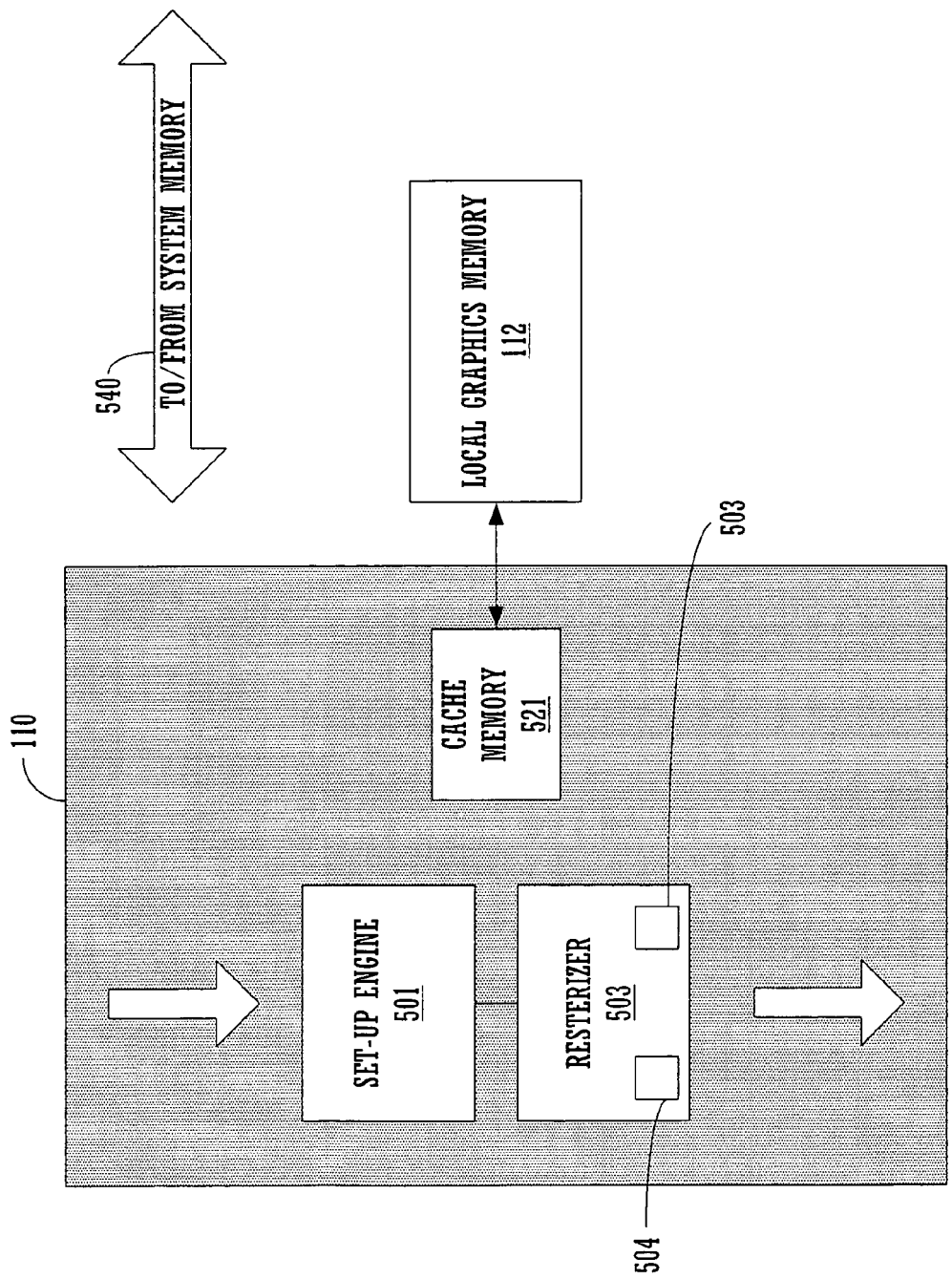
FIG. 5 shows a diagram of internal components of a GPU in accordance with one embodiment of the present invention.

FIG. 5 shows a diagram 500 of internal components of the GPU 110 in accordance with one embodiment of the present invention. As shown in FIG. 5, the GPU 110 includes a setup engine 501 and a rasterizer unit 502. In the present embodiment, the functionality of the present invention is implemented within the hardware and software of the rasterizer unit 502. Generally, the rasterizer unit 502 functions by converting descriptions based on vertices, received from the setup engine 501, to descriptions based on edge descriptions. The rasterizer unit 502 subsequently converts these edge descriptions into filled areas comprising actual pixel descriptions (e.g., pixel areas, pixel sub-samples, etc.). The pixel descriptions are subsequently passed along to other units within the GPU 110 for further processing and rendering.

In one embodiment, the rasterizer unit 502 includes a fine raster component 503 and a coarse raster component 504. The coarse raster component 504 implements the tile based boustrophedonic pattern rasterizing as described above, as it rapidly searches a grid of tiles to identify tiles of interest (e.g., tiles that are covered by a primitive). Once the tiles of interest are identified, the fine raster component 503 individually identifies the pixels that are covered by the primitive. Hence, in such an embodiment, the coarse raster component 504 rapidly searches a grid of pixels by using tiles, and the fine raster component 503 uses the information generated by the coarse raster component 504 and implements fine granularity rasterization by individually identifying pixels covered by the primitive. In both cases, both the coarse raster component 504 and the fine raster component 503 can utilize one or more boustrophedonic patterns (e.g., nested or non-nested) during their rasterization.

Referring still to FIG. 5, the GPU 110 further includes a cache memory 521 that functions by implementing high-speed low latency storage for the most frequently used graphics rendering data. Such data typically comprises texture information, vertex information, colors, and the like. The cache memory 521 is shown coupled to the local graphics memory 112. The cache memory 521 utilizes one or more cache maintenance mechanisms to maintain coherency with the local graphics memory 112. The arrow 540 shows the communications pathway between the GPU 110 and the system memory (e.g., memory 115 shown in FIG. 1). Communication with system memory 115 is typically much slower than even communication with the local graphics memory 112. Accordingly, the memory access localization attributes of embodiments of the present invention greatly reduced the penalties incurred by accessing the local graphics memory 112 and the system memory 115 by minimizing the number of cache misses that occur.

In one embodiment, the present invention is implemented as a GPU having a raster unit configured to implement boustrophedonic pattern rasterization, whereby a number of performance attributes of the boustrophedonic pattern rasterization process are programmable. In such an embodiment, for example, the number of pixels per tile is programmable in accordance with a size of a cache memory of the GPU. Similarly, the configuration of the first boustrophedonic pattern, the second boustrophedonic pattern, and the like, are programmable (e.g., the predominant axis, tile size, initiating order, finishing order, and the like).

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for traversing pixels of an area, comprising:
    traversing a plurality of pixels of an image using a first boustrophedonic pattern along a predominant axis by using a processor of a computer system; and
    during the traversal using the first boustrophedonic pattern, traversing a plurality of pixels of the image using a second boustrophedonic pattern using the processor, wherein the second boustrophedonic pattern is nested within the first boustrophedonic pattern, and wherein the second boustrophedonic pattern is traversed in a pattern orthogonal to the predominant axis of the first boustrophedonic pattern.

2. The method of claim 1, wherein the plurality of pixels of the image are grouped as tiles and the tiles are traversed using the first boustrophedonic pattern and the second boustrophedonic pattern.

3. The method of claim 1, wherein the predominant axis of the first boustrophedonic pattern is a horizontal axis, and wherein the second boustrophedonic pattern is along a vertical axis.

4. The method of claim 1, wherein the predominant axis of the first boustrophedonic pattern is a vertical axis, and wherein the second boustrophedonic pattern is along a horizontal axis.

5. The method of claim 1, wherein the first boustrophedonic pattern and the second boustrophedonic pattern are configured to maintain locality with respect to cache memory accesses.

6. The method of claim 1, wherein the first boustrophedonic pattern and the second boustrophedonic pattern are configured to align with a prefetching process for accessing memory.

7. The method of claim 1, wherein the first boustrophedonic pattern and the second boustrophedonic pattern are configured to maintain locality with respect to memory bank accesses of a frame buffer memory.

8. The method of claim 1, wherein a plurality of boustrophedonic patterns are nested within the first boustrophedonic pattern.

9. A non-transitory computer readable media having computer readable code which when accessed by a processor of a computer system, causes the computer system to implement a method for traversing pixels of an area, the method comprising:
    traversing a plurality of pixels of an image using a first boustrophedonic pattern along a predominant axis; and
    during the traversal using the first boustrophedonic pattern, traversing a plurality of pixels of the image using a second boustrophedonic pattern, wherein the second boustrophedonic pattern is nested within the first boustrophedonic pattern, and wherein the second boustrophedonic pattern is traversed in a pattern orthogonal to the predominant axis of the first boustrophedonic pattern.

10. The non-transitory computer readable media of claim 9, wherein the plurality of pixels of the image are grouped as tiles and the tiles are traversed using the first boustrophedonic pattern and the second boustrophedonic pattern.

11. The non-transitory computer readable media of claim 9, wherein the predominant axis of the first boustrophedonic pattern is a horizontal axis, and wherein the second boustrophedonic pattern is along a vertical axis.

12. The non-transitory computer readable media of claim 9, wherein the predominant axis of the first boustrophedonic pattern is a vertical axis, and wherein the second boustrophedonic pattern is along a horizontal axis.

13. The non-transitory computer readable media of claim 9, wherein the first boustrophedonic pattern and the second boustrophedonic pattern are configured to maintain locality with respect to cache memory accesses.

14. The non-transitory computer readable media of claim 9, Wherein the first boustrophedonic pattern and the second boustrophedonic pattern are configured to align with a prefetching process for accessing memory.

15. The non-transitory computer readable media of claim 9, wherein the first boustrophedonic pattern and the second boustrophedonic pattern are configured to maintain locality with respect to memory bank accesses of a frame buffer memory.

16. The non-transitory computer readable media of claim 9, wherein a plurality of boustrophedonic patterns are nested within the first boustrophedonic pattern.

17. A computer system, comprising:
    a system memory;
    a central processor unit coupled to the system memory;
    a graphics processor unit communicatively coupled to the central processor unit, the graphics processor unit, when executing computer readable code, implements a method comprising;
        traversing a plurality of pixels of an image using a first boustrophedonic pattern along a predominant axis; and
        during the traversal using the first boustrophedonic pattern, traversing a plurality of pixels of the image using a second boustrophedonic pattern, wherein the second boustrophedonic pattern is nested within the first boustrophedonic pattern, and wherein the second boustrophedonic pattern is traversed in a pattern orthogonal to the predominant axis of the first boustrophedonic pattern.

18. The computer system of claim 17, wherein the plurality of pixels of the image are grouped as tiles and the tiles are traversed using the first boustrophedonic pattern and the second boustrophedonic pattern.

19. The computer system of claim 17, wherein a plurality of boustrophedonic patterns are nested within the first boustrophedonic pattern.

20. The computer system of claim 17, wherein the first boustrophedonic pattern and the second boustrophedonic pattern are configured to maintain locality with respect to cache memory accesses.

* * * * *